United States Patent [19]

Bongiovanni

[11] Patent Number: 4,687,115

[45] Date of Patent: Aug. 18, 1987

[54] REMOVING SEDIMENT FROM WINE

[76] Inventor: Lino Bongiovanni, Via Vittori, 37030 Ronca (Verona), Italy

[21] Appl. No.: 758,057

[22] Filed: Jul. 23, 1985

[30] Foreign Application Priority Data

Aug. 9, 1984 [IT] Italy .............................. 84121 A/84

[51] Int. Cl.⁴ ........................................... B65D 39/00
[52] U.S. Cl. .................................... 215/355; 215/360
[58] Field of Search ....................... 215/360, 355, 358

[56] References Cited

U.S. PATENT DOCUMENTS

| | | | |
|---|---|---|---|
| 251,047 | 12/1881 | Hand | 215/360 |
| 279,455 | 6/1883 | Stahlin | 215/360 |
| 756,283 | 4/1904 | Reed | 215/360 |
| 2,046,224 | 6/1936 | Vanderhoof | 215/360 |
| 2,355,492 | 8/1944 | White | 215/360 |
| 2,439,628 | 4/1948 | Kopecky | 215/360 |
| 2,822,104 | 2/1958 | Busch | 215/360 |
| 3,015,403 | 1/1962 | Fuller | 215/360 |
| 3,831,601 | 8/1974 | Kessell | 215/360 |

Primary Examiner—Joseph Man-Fu Moy
Attorney, Agent, or Firm—Charles W. Fallow; Martin P. Hoffman; Mitchell B. Wasson

[57] ABSTRACT

The method for rendering wines sparkling is characterized by forming a dreg collection chamber inside the stopper, keeping said chamber in communication with the bottle interior during the dreg removal stage when the bottle is inverted or inclined, in order to enable the dregs to enter the stopper and, on termination of this stage or in any case before placing the bottle the right way up, interrupting communication between the dreg collection chamber and the bottle interior by acting from the outside, and so retaining said dregs in said chamber.

To implement this method, the invention provides for the use of a plastic stopper characterized by comprising a first element which can be securely fitted to the bottle neck and contains an internal cavity, and a second element which is mobile relative to said first element in order, as a result of its movement, to open and close the dreg collection chamber provided in the interior of said second element and/or of said first element.

10 Claims, 6 Drawing Figures

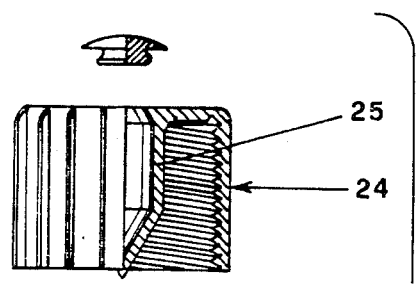
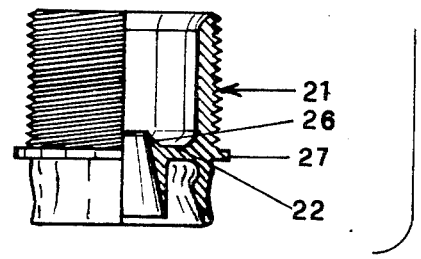
FIG.4
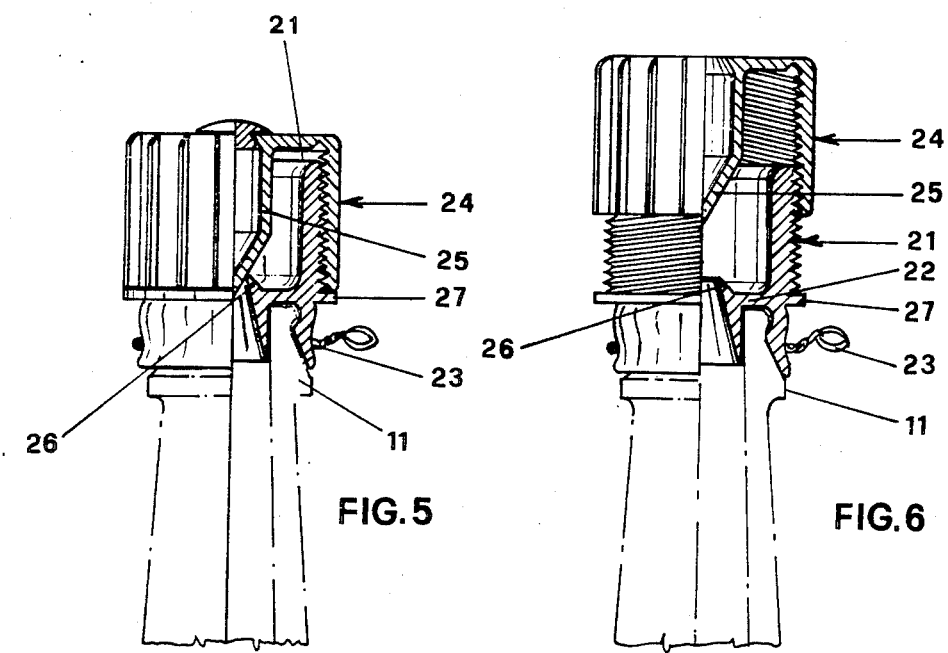
FIG.5　　FIG.6

REMOVING SEDIMENT FROM WINE

This invention relates to a method for rendering wines sparkling, derived from the known so-called "champenois" method, and a plastic stopper for implementing the method.

The champenois method for rendering wines sparkling by natural means is known. According to this, the grapes are pressed to obtain the must, which is then fermented and subjected to a series of analyses, checks and corrections which lead to the required chemical, physical and organoleptic characteristics. The must treated in this manner is then allowed to become sparkling and to mature over its own dregs, which finally have to be removed.

Removing the dregs from the matured wine is always a long, complicated and delicate procedure which requires the assistance of highly qualified personnel. In this respect, after the bottles have been filled, they are laid horizontally in stacks for the time necessary for the yeast enzymes to mature. During this period, they are subjected to periodic shaking to shift the deposited sediment. When yeast maturation is complete, the bottles are placed in an inclined position on special racks where they are periodically rotated in order to cause the dregs to collect in proximity to the stopper. When sedimentation is complete, the bottle stopper is removed to allow a small quantity of wine to escape to the outside, and under the pressure of the gas it entrains the dregs with it. Finally, the bottle is restoppered and is ready for sale.

However, this known method has the serious drawback of resulting in a considerable loss of product, accompanied by a damaging alteration in the organoleptic characteristics of the wine, and a considerable loss of the fermentation gas, which constitutes one of the fundamental and most valued components of the product.

In order to eliminate or at least reduce this drawback, it has also been proposed to remove the dregs after freezing the wine in proximity to the neck by means of brine, so as to facilitate this removal. However, again in this case the results are not considered completely satisfactory in that the removal of the dregs always represents a procedure which induces a certain turbidity in the product and also results in considerable cost in terms both of material and specialised labour.

An object of the invention is to propose a method for rendering wines sparkling which, in contract to the known champenois method, does not require removal of the dregs and therefore obviates all the drawbacks which this removal entails.

A further object of the invention is to propose a plastic stopper which enables this method to be implemented.

A further object of the invention is to propose a plastic stopper which is applicable to any bottle without the need for special equipment and independently of inevitable constructional imperfections in the bottle itself or of variations in the internal diameter of its neck.

These objects are attained according to the invention by a method for rendering wines sparkling, characterised by forming a dreg collection chamber inside the stopper, keeping said chamber in communication with the bottle interior during the dreg removal stage when the bottle is inverted or inclined, in order to enable the dregs to enter the stopper and, on termination of this stage or in any case before placing the bottle the right way up, interrupting communication between the dreg collection chamber and the bottle interior by acting from the outside, and so retaining said dregs in said chamber.

To implement this method, the invention provides for the use of a plastic stopper characterised by comprising a first element which can be securely fitted to the bottle neck and contains an internal cavity, and a second element which is mobile relative to said first element in order, as a result of its movement, to open and close the dreg collection chamber provided in the interior of said second element and/or of said first element.

Advantageously the stopper can comprise:
a first element with a body for introduction into the bottle neck and a head emerging from said neck, said body being provided with an upperly open, internally threaded axial cylindrical cavity which is closed lowerly and of which a lower band is provided with slots, and
a second hollow, upperly closed cylindrical element provided externally with a thread engageable in the thread of the inner cavity of the first element, and of which a lower band is unthreaded and is of height at least equal to the height of the slots in order to close these latter when the lower edge of said element adheres to the base of the first element.

Again according to the invention the stopper can comprise:
a first bush-shaped element which can be fitted under sealed conditions to the rim of the bottle neck and is provided internally with a cavity disposed on the prolongation of said neck to constitute the dreg collection chamber, and
a second element which is mobile axially to the first element and provided with a shutter member cooperating with a circumferential flange provided inside said first element in order to close, when in a predetermined axial position, said dreg collection chamber.

Two preferred embodiments of the present invention are described hereinafter by way of non-limiting example with reference to the accompanying drawings in which:

FIG. 4 shows a different embodiment of a plastic stopper in the same view as FIG. 1;

FIG. 5 shows it fitted to a bottle neck and disposed in the configuration corresponding to that of FIG. 2; and FIG. 6 shows it in the configuration corresponding to that of FIG. 3.

Figure 1:
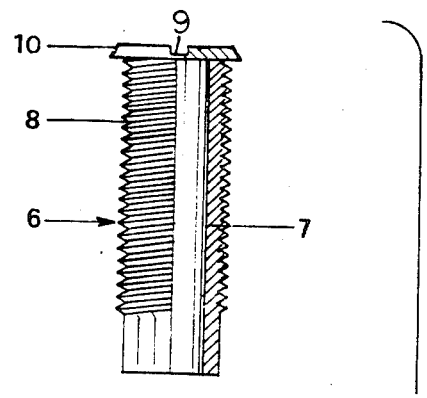
FIG. 1 is a partly sectional, exposed side view of a first embodiment of a plastic stopper according to the invention.
Figure 2:
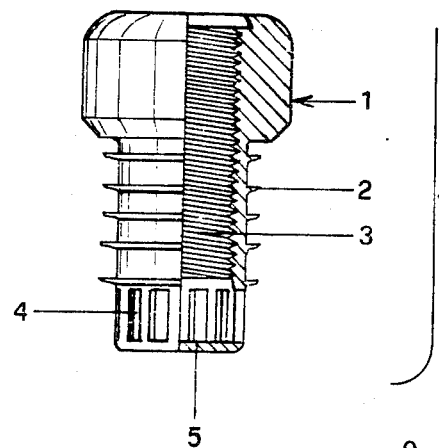
FIG. 2 is an axial section showing it fitted to a bottle neck and disposed in a configuration in which the dreg collection chamber is completely separated from the internal space in the bottle.
Figure 2:
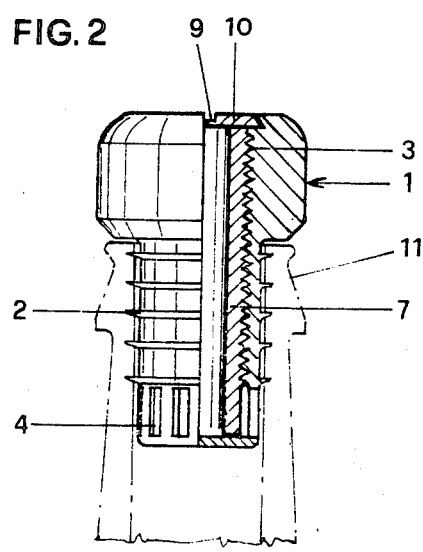
Figure 3:
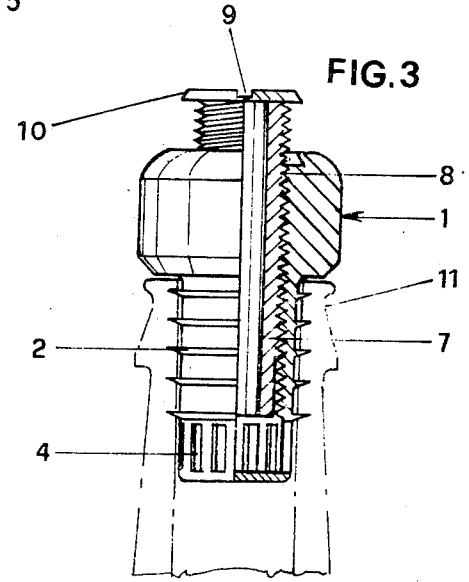
FIG. 3 shows it in the same view as FIG. 2, but in a configuration which allows the dregs to enter the collection chamber.

As can be seen from the drawings, in the embodiment shown in FIGS. 1 to 3 the stopper according to the invention comprises a first element 1 with outer circumferential sealing fins 2 and a cylindrical axial cavity 3. It is substantially in the shape of traditional plastic stoppers and differs from these only in that the cavity 3 is upperly open, is internally threaded and is provided with a plurality of slots 4 in its lower circumferential band, which is closed lowerly by a base 5.

The stopper according to the invention also comprises a second element 6 essentially constituted by a hollow cylindrical body 7 closed upperly and open lowerly. The threaded portion of the cylindrical body 7 does not extend over its entire height, but excludes a lower band having a height slightly greater than the height of the slots 4 of the element 1. Its diameter is greater than the diameter of the unthreaded lower band.

The upper end 8 of the element 6 also comprises a notch 9 for engagement by any tool able to rotate the element 6, in the manner described hereinafter.

Finally, the upper end of the element 1 comprises a circular seat with a dovetail edge, in which a flanged portion 10 of the end 8 irreversibly snap-engages.

The operation of the stopper according to this first embodiment of the invention is as follows:

After the bottle has been filled, the stopper is inserted into its neck 11 with the element 6 completely screwed down into the element 1, so that the unthreaded lower portion of said element 6 closes the slots 4 of said element 1 in a sealed manner (see FIG. 2). The stopper can then be securely bound to the bottle, for example by means of a conventional metal or metal-plastic net.

The bottle is then disposed horizontally while maturation and fermentation of the yeast enzymes take place, with corresponding sedimentation of the dregs. During this stage, the bottle should be periodically shaken to displace the sedimented dregs, as in the traditional champenois method.

When maturation and fermentation are complete, or when they have reached their conclusive stage, the element 6 is rotated relative to the element 1 in the direction which causes it to emerge axially and thus open the slots 4, which are no longer covered by the unthreaded band of the element 6 (see FIG. 3). The bottle is then placed in a downwardly inclined position so that the dregs are able to enter the collection chamber constituted by the internal cavity of the element 6. This operation, which can be accompanied by periodical rotation of the bottles, and can also be repeated several times, terminates on reclosing the dreg collection chamber, again by turning the element 6 but this time in the direction which screws it down.

In this manner all the sedimented dregs which have entered the collection chamber inside the element 6 are definitively separated from the wine without any possibility of further contaminating it.

From the aforesaid it is clear that the method according to the invention, by which the dregs separated from the wine are retained inside the stopper, is particularly advantageous in that it dispenses with all the complicated and costly operations involved in removing the dregs, and all the drawbacks associated with them. In particular this method, and the stopper which enables it to be implemented, eliminate any turbidity in the wine and make it possible to separate the dregs by simple screwing and unscrewing operations, without any need for removing the stopper and/or for special techniques and treatment by specialised personnel.

Moreover, because of the form of the stopper, which is entirely similar to the form of traditional plastic stoppers, the current equipment used by bottlers can be equally utilised without even the minimum modification.

Finally, because of the fact that the stopper according to the invention is of the same form as traditional stoppers, it does not represent an element of surprise to the consumer when he opens the bottle.

In the embodiment shown in FIGS. 4 to 6, the stopper according to the invention has special characteristics which enable it to be adapted to bottles of any shape.

It comprises an externally threaded bush 21 open at both ends and provided internally with a circumferential flange 22 with its edge of T configuration. That portion of the lateral surface of the bush 21 which lies below the flange 22 is profiled with a shape complementary to the outside of the rim of the bottle neck 11, and comprises a circumferential seat for housing a traditional metal ring 23 which securely fixes said bush 21 to said neck 11. Alternatively, in a modified embodiment which is not shown in the drawings, the bush 21 can be provided with a circumferential portion which can be torn away in accordance with methods widely used in the past.

A cover 24 provided axially with a conical shutter element 25 can be screwed on to the bush 21. More particularly, when the cover 24 is partially unscrewed from the bush 21, the conical shutter 25 is spaced from the upper rim 26 of the flange 22 (see FIG. 6), whereas when the cover 24 is completely screwed down on the bush 21 (this position is defined by the lower edge of said cover 24 halting against an abutment flange 27 provided in the bush 21), the conical shutter 25 adheres in a sealed manner against said upper rim 26 of the flange 22 (see FIG. 5).

The operation of this second embodiment of the stopper according to the invention is as follows:

The bush 21 with the cover 24 totally screwed on to it is pressed over the top of the bottle neck 11, and is securely fixed to it by the metal ring 23 or by the tearable band, according to the type of construction of said bush. In accordance with the previously described method, when the dregs are to be separated from the wine, the cover 24 is partially unscrewed so as to cause the conical shutter 25 to move axially and allow the dregs to accumulate in the collection chamber constituted by the annular compartment defined by the cylindrical wall of the bush 21 and the wall of the conical shutter 25. On termination of this operation, which is carried out and if necessary repeated in the aforesaid manner, the cover 24 is again completely screwed down to definitively close the dreg collection chamber and prevent the dregs escaping.

In addition to the advantages indicated heretofore, the stopper according to this second embodiment of the invention also has other important advantages, and in particular:

in the version with the tearable band, the elimination of the net normally required on all bottles containing sparkling wines, universal application because the stopper lies on the outside of the bottle neck and is therefore insensitive to the inevitable variations in the internal diameter of the bottle neck.

It should be noted that although the stoppers heretofore described are intended for bottles containing sparkling wines, they are applicable in general to any container containing liquids which produce sediments.

I claim:

1. A plastic stopper for collecting dregs from a bottle of wine when the bottle is inverted, and for trapping the dregs therein before the bottle is turned upright, comprising a first element which can be securely fitted to the bottle neck, said first element defining an internal chamber for receiving dregs from the wine, and having an aperture therein for providing communication between the chamber and the bottle interior so as to admit dregs to said chamber, and a second element movably received within said first element and having an external manipulable portion by which the second element may be moved, while the stopper is installed on the bottle, between a first position in which the aperture is open, and a second position in which the aperture is blocked by a portion of said second element, whereby one may trap dregs collected in the chamber by moving the second element to said second position while the bottle is inverted.

2. A stopper as claimed in claim 1, wherein the second element is axially movable relative to the first element.

3. The invention of claim 1, wherein said first element has an internal helical thread, and said second element has a mating external helical thread engaged therewith, whereby rotating the second element relative to the first causes said second element to move axially with respect to said first element for blocking said aperture.

4. A plastic stopper for collecting dregs from a bottle of wine when the bottle is inverted, and for trapping the dregs therein before the bottle is turned upright, comprising a first element including a body for introduction into the bottle neck and a head that remains outside said neck, said body defining an internally threaded cylindrical cavity which is closed at the end opposite said head, said body including a lower band having apertures for admitting dregs into the cavity, and a second, hollow, upwardly closed cylindrical element having an external thread engageable within the thread of said cavity of the first element and having a lower unthreaded band at least equal in height to that of said apertures in order to close said cavity when the lower edge of said element abuts the base of the first element, whereby one may trap dregs collected in the chamber by moving the second element while the bottle is inverted.

5. A stopper as claimed in claim 4, wherein the upper end of said second element comprises means defining a notch for easy engagement by a tool suitable for rotating said second element relative to the first element.

6. A stopper as claimed in claim 4, wherein the upper end of said first element comprises a seat which engages the upper end of said second element when the latter is completely screwed into the first element.

7. A plastic stopper for collecting dregs from a bottle of wine when the bottle is inverted, and for trapping the dregs therein before the bottle is turned upright, comprising a first bush-shaped element which can be fitted in a sealed manner to the rim of the bottle neck and includes means defining a cavity within the neck to act as a dreg collection chamber for receiving dregs from the wine, and having an aperture therein for providing communication between the chamber and the bottle interior so as to admit dregs to said chamber, said chamber having an internal flange around the circumference of said aperture, and a second element received within said first element and which is movable axially relative to the first element and includes a shutter member cooperating with said flange in order to close, when in a predetermined axial position, said dreg collection chamber, whereby one may trap dregs collected in the chamber by moving the second element while the bottle is inverted.

8. A stopper as claimed in claim 7, wherein the first element has an external screw thread and a circumferential flange dividing its lateral wall into an upper portion, forming the lateral wall of the dreg collection chamber, and a lower portion which is internally profiled so as to mate with the rim of the bottle neck.

9. A stopper as claimed in claim 8, wherein the second element has an internal screw thread cooperating with the external thread of the first element, and said first element has on its outer lateral wall a flange for halting said second element in the position in which the dreg collection chamber is closed.

10. A stopper as claimed in claim 7, wherein said first element comprises an inner flange having a T-shaped edge, having upper and lower rims, the lower rim of which engages the inner surface of the bottle neck when the first element is introduced into the bottle, and the upper rim of which engages the shutter of the second element when the latter is completely screwed down on the first element.

* * * * *